April 25, 1933.  C. A. HAWKINS ET AL  1,905,865
VEHICLE
Filed Aug. 2, 1929  4 Sheets-Sheet 4
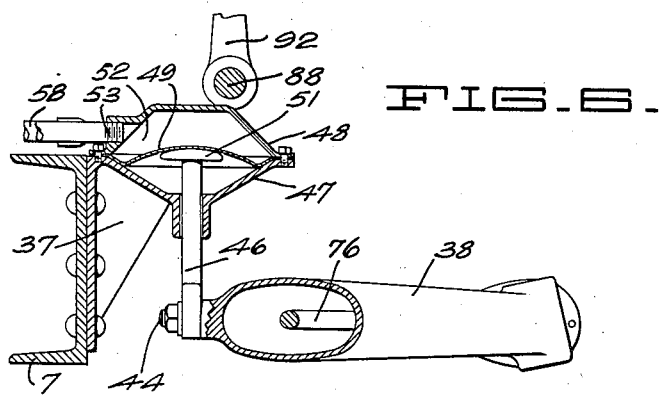
FIG. 6.
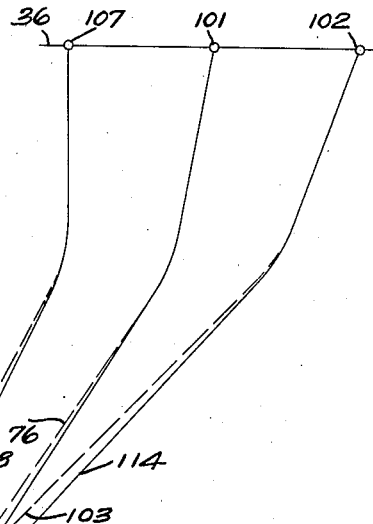
FIG. 7.
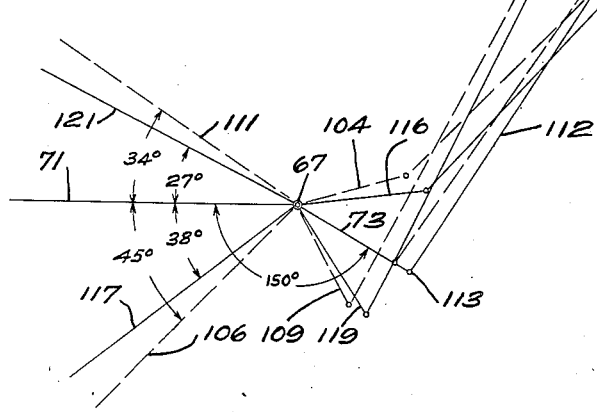
INVENTORS:
Charles A. Hawkins
Horace L. Hirschler
Marcus Lothrop
BY White, Prost, Flehr & Lothrop
ATTORNEYS.

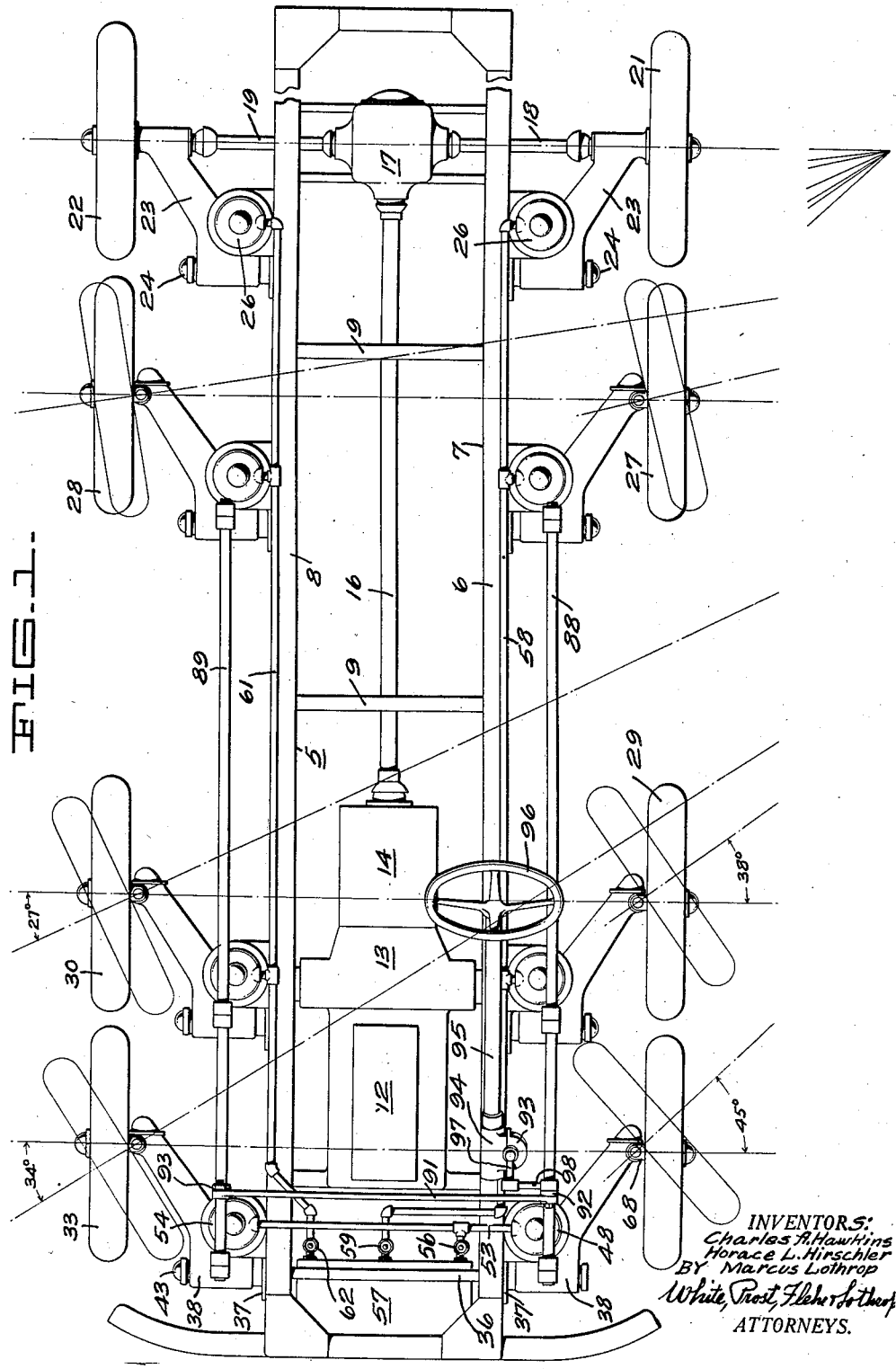

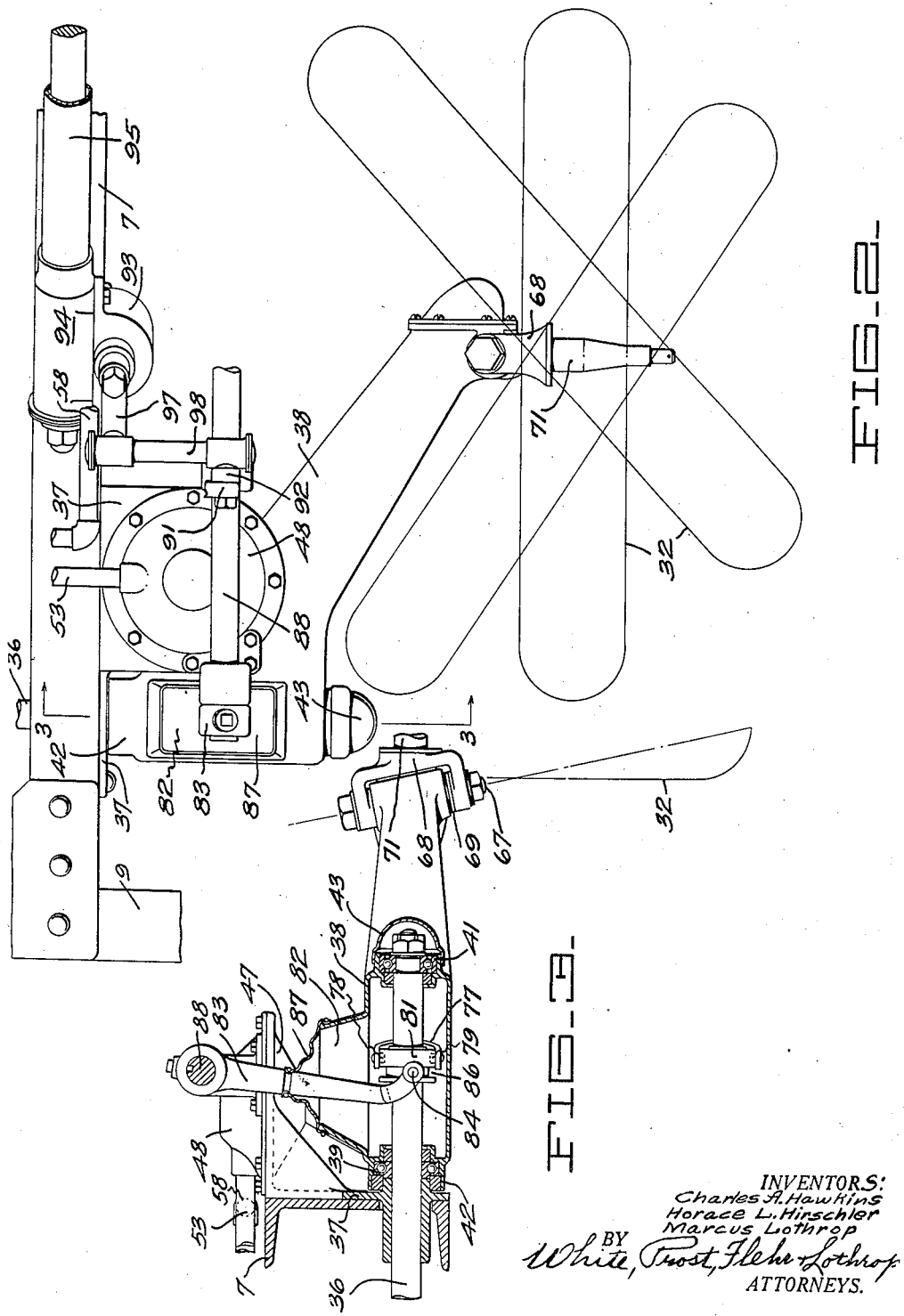

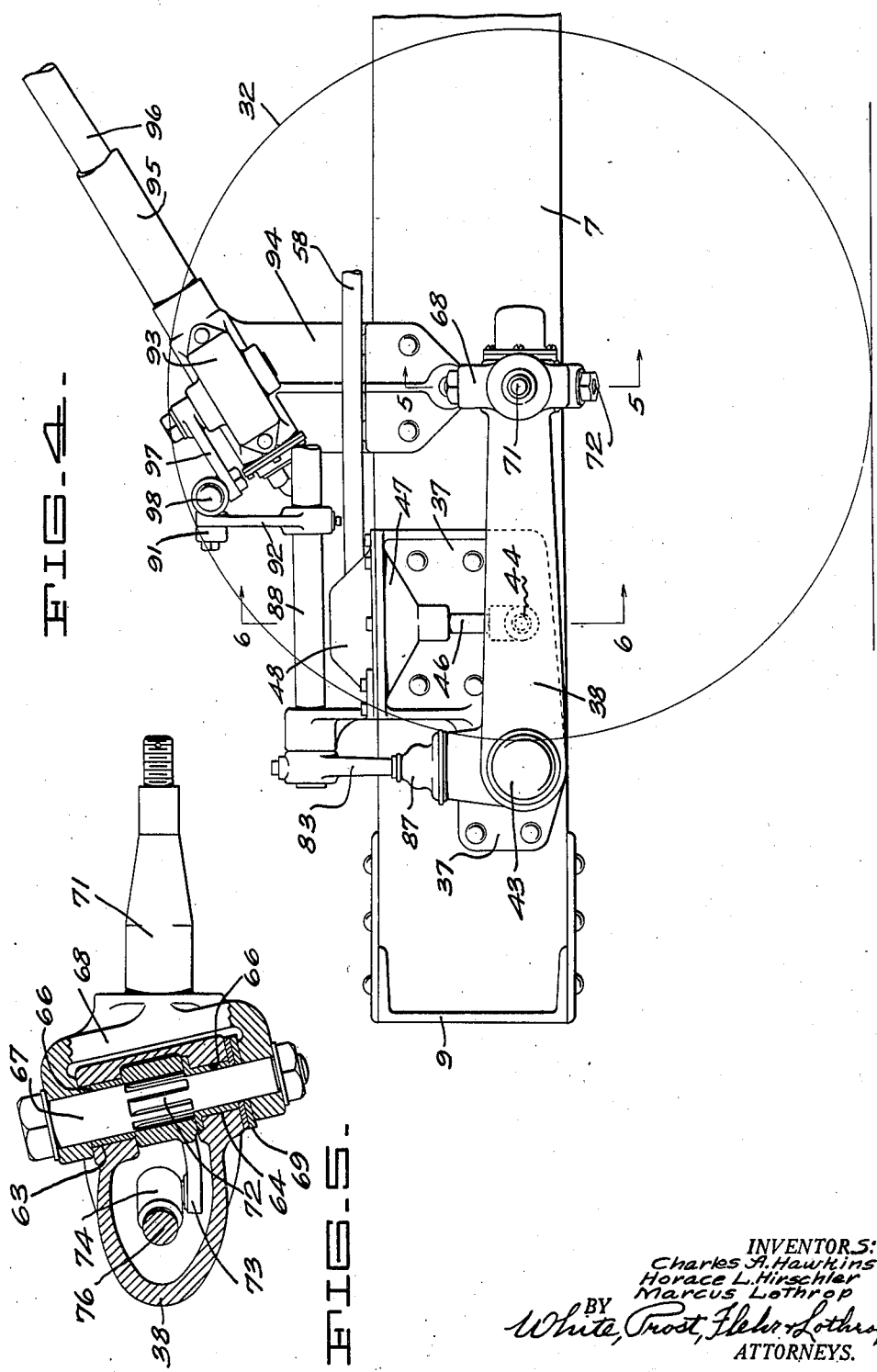

Patented Apr. 25, 1933

1,905,865

UNITED STATES PATENT OFFICE

CHARLES A. HAWKINS AND HORACE L. HIRSCHLER, OF SAN FRANCISCO, AND MARCUS LOTHROP, OF BERKELEY, CALIFORNIA, ASSIGNORS, BY DIRECT AND MESNE ASSIGNMENTS, TO HAWKINS PATENTS, LTD., OF RENO, NEVADA, A CORPORATION OF NEVADA

VEHICLE

Application filed August 2, 1929. Serial No. 382,972.

Our invention relates particularly to automotive vehicles and especially to vehicles of the multi-wheel type such as are shown in the patent to C. A. Hawkins, entitled Vehicle suspension, No. 1,721,732, dated July 23, 1929. Such vehicles usually are provided with at least six wheels and ordinarily utilize eight or more wheels. With such a large number of ground engaging wheels it is a difficult matter to arrange each of the wheels so that it can be steered with mathematical exactitude and also to secure the wheels to the vehicle frame in such a manner that they will have the proper and desired movement and supporting effect.

An object of our invention is to provide a vehicle in which the dirigible wheels are steered exactly.

Another object of our invention is to provide a vehicle in which the wheels are individually supported on the vehicle frame.

Another object of our invention is to provide a steering mechanism which will be unaffected by rising and falling movement of the wheels as the vehicle traverses undulatory country.

Another object of our invention is to provide a relatively simple and flexible manner of attaching the steering wheels to the vehicle frame.

The foregoing and other objects are attained in the embodiment of the invention shown in the drawings, in which Fig. 1 is a plan, somewhat diagrammatic, of a representative vehicle constructed in accordance with our invention.

Fig. 2 is a plan showing in enlarged detail one of the wheels employed.

Fig. 3 is a cross section on the line 3—3 of Fig. 2.

Fig. 4 is a side elevation of the assembly shown in Fig. 2.

Fig. 5 is a cross section on the line 5—5 of Fig. 4.

Fig. 6 is a cross section on the line 6—6 of Fig. 4.

Fig. 7 is a diagram showing the relative movement of a portion of the steering linkage.

In its preferred form, the vehicle of our invention comprises a frame to which a plurality of ground engaging wheels are secured for pivotal movement about a substantially horizontal axis, the wheels being provided with a steering mechanism which is unaffected by the rising and falling pivotal movement of the wheels with respect to the frame.

While our invention can be incorporated in a number of various types of vehicles, we have chosen to describe and show it herein as it is applied to a vehicle having eight ground engaging wheels generally designated as 5, although various different numbers of wheels can be employed if desired. As particularly shown in Fig. 1, the vehicle is provided with a main frame 6 having side rails 7 and 8 joined by suitable cross members 9.

Mounted in the frame is a source of power such as internal combustion engine 12 connected through a suitable clutch 13 and transmission 14 to a drive shaft 16 transmitting power to a differential 17. Extending at either side of the differential are axle shafts 18 and 19 for transmitting power to the two rear wheels 21 and 22. It will be understood that power can be transmitted to any of the wheels desired but for the sake of simplicity in describing the invention the two rear wheels are indicated herein as receiving power from the engine 12.

Each of the wheels 21 and 22 is mounted on a support arm 23 which in some cases extends forwardly and inwardly to a journalled mounting on a substantially horizontal pivot 24 secured to the frame 6. Interposed between each of the arms 23 and the frame is a restraining device 26 for limiting the relative rising and falling pivotal movement between the wheels and the frame. In the present instance, the limiting device includes a variable pneumatic chamber. The support arms and pneumatic chambers will be described more in detail in connection with certain of the vehicle wheels which are also capable of dirigible or steering movement.

Arranged on the frame 6 immediately ahead of the rear wheels 21 and 22 are wheels 27 and 28 which are capable of dirigible movement. Further toward the front of the vehicle are arranged support wheels 29 and 30 which likewise are capable of dirigible movement and at the front of the vehicle are disposed wheels 32 and 33 also designed for steering or dirigible movement. Since all of the dirigible wheels are practically identical, it will suffice to describe in detail wheel 32 and its associated structure.

Passing substantially horizontally through the side rails 7 and 8 of the frame 6 and having an axis which is disposed substantially horizontal is a rod 36 held at each side of the frame in a mounting plate 37. The rod is non-rotatably fixed by any suitable means, not shown. Journalled on an extending portion of rod 36 and adapted to pivot about the axis of the rod is a hollow support arm 38. Preferably, anti-friction bearings 39 and 41 are interposed between the rod 36 and the hub of the support arm, while a suitable dust seal 42 is provided at the inner end of the hub and a dust cap 43 is mounted at the outer end of the hub.

To restrain or confine yieldably the pivotal movement between the support arm 38 and the frame 6 we preferably provide suitable support devices as mentioned in connection with wheels 21 and 22. Extending from the inner side of the support arm is a pin 44 forming a pivotal mounting for a plunger 46 journalled thereon. The plunger extends substantially vertically and enters the lower portion of a casing 47 closed by a cap 48, and conveniently secured to mounting plate 37. Interposed between the cap and lower portion of the casing is a flexible diaphragm 49 against which the mushroom top 51 of the plunger abuts. Pivotal movement of the support arm 38 about the axis of rod 36 serves to reciprocate the rod 46 within the casing 47 and to flex the diaphragm 49.

In order to resist yieldably the movement of the diaphragm we preferably provide means for furnishing air under pressure to the chamber 52 encompassed between the diaphragm 49 and the cap 48. Entering the cap is a conduit 53 which extends across the frame 6 and communicates with a comparable restraining device 54 associated with wheel 33. Between its ends, the conduit 53 communicates through a normally closed valve 56 with a pneumatic reservoir 57 conveniently disposed at the forward end of the frame 6. By this arrangement, there is a free inter-flow or inter-communication of air between the chamber 52 of the device at the left hand side of the frame and the corresponding chamber in the device 54 at the right hand side of the frame.

It may be noted that since all of the support arms 38 are each provided with an associated pneumatic device, these devices are preferably interconnected as shown in Fig. 1. The front two devices intercommunicate transversely of the frame as has been described while the devices associated with wheels 21, 27 and 29 inter-communicate longitudinally of the frame through a conduit 58 leading through a normally closed valve 59 to reservoir 57. The devices associated with wheels 22, 28 and 30 likewise communicate longitudinally of the frame through a conduit 61 and a normally closed valve 62 connected to the reservoir 57. The interconnection of the various pneumatic devices, as described, is in accordance with the disclosure in the Hawkins patent above referred to, although different manners of inter-communication or connection may be employed as well.

At the trailing extremity of each of the supporting arms 38, except the rear pair, we preferably provide a dirigible or pivotal mounting for the associated wheel 5. According to one method of manufacture, the hollow supporting arm is provided with two aligned, approximately vertical bores 63 and 64 which are lined with anti-friction bushings 66 and receive a steering pin 67, the axis of which is approximately vertical. Preferably mounted on the steering pin and fixed to revolve therewith is a wheel yoke 68. Interposed between the support arm 38 and the yoke are thrust washers 69. Extending from the steering yoke 68 is a steering spindle 71 adapted to receive the bearings for the wheel 32 in the customary fashion.

With this type of mounting the wheel 32 is not only capable of rotation about the axis of spindle 71 but it is also capable of limited rotary or pivotal movement about the axis of shaft 36 and the wheel rises and falls during the use of the vehicle over undulatory territory. It is an advantage of this method of mounting that the plane of the wheel when in straight ahead position is perpendicular to the axis of shaft 36 so that rising and falling movements of the wheel do not alter the gyroscopic orbit of the wheel and introduce forces which normally tend to produce shimmy and other undesirable characteristics of a steering wheel.

In order to steer the wheel 32 with as nearly as possible mathematical exactitude and in order to provide a steering mechanism which is unaffected by rising and falling movement of the wheel as the vehicle traverses uneven ground, we preferably construct the pin 67 with a splined or non-circular portion 72 which is adapted to receive a steering arm 73 projecting into the interior of the hollow support arm 38. Connected to the steering arm, preferably by a ball and socket connection 74, is one end of a link 76 which preferably passes through the hollow arm 38 and at its forward end is forked as at 77. Trunnions 78 and 79 projecting from the forked end engage a collar 81 adapted to be translated along the extension of shaft 36 and to lie coaxial therewith. Since the shaft 36 is stationary and wheel 32 and arm 38 are adapted to pivot about the axis of the shaft, the collar 81 likewise is capable of pivoting or revolving slightly about the shaft 36.

To impart steering movement or dirigible movement to wheel 32 to cause it to pivot about the substantially vertical axis of the pin 67 we preferably provide means for translating the collar 81 axially along the shaft 36. Passing through an opening 82 in the upper portion of the support arm 38 is a crank arm 83 which at its lower end is forked and is provided with trunnions 84 which are received in a groove 86 circumscribing collar 81. Preferably, a flexible boot 87 is secured to the crank arm 83 and to the walls bounding opening 82 in order to keep out dust and dirt. The upper end of the crank arm is mounted to revolve with a longitudinal shaft 88 journalled on and extending parallel to the frame side rail 7. A similar shaft 89 extends along the side rail 8. Rotary movement of shaft 88 oscillates crank arm 83 and translates collar 81 along the shaft 36.

So that the two shafts 88 and 89 can be revolved simultaneously we preferably interconnect them by a cross link 91 extending transversely of the frame 6 and at its opposite ends secured pivotally to the upper ends of similar cranks 92 and 93 affixed to their respective shafts 88 and 89. To impart steering or directive movement to the cross link 91 a standard steering gear 93 is preferably mounted on a bracket 94 affixed to the frame side rail 7 and is provided with a steering column 95 leading to a steering wheel 96 of the usual type. Projecting from the steering gear is a drag arm 97 of the customary kind which is connected through a drag link 98 with the cross link 91. Thus steering movement of the steering wheel 96 is effective to revolve simultaneously the shafts 88 and 89 and to translate along their respective axes all of the collars 81 on their shafts 36.

As the collars 81 are translated, the links 76 oscillate the steering arms 73 to effect pivotal or dirigible movement of the wheels. Since the collars 81 are coaxial with the pivotal axis of the supporting arms 38, rising and falling movements of the individual wheels have absolutely no effect on the steering properties of the vehicle so that the mechanism for transmitting steering movement from the directing device or steering gear on the main frame to the individual wheels is unaffected by any pivotal movement of the wheels about their support axes.

As shown diagrammatically in Fig. 7, uniform translating movement of the collar along the axis of shaft 36 is capable of producing the desired pivotal movement of the wheel with exactitude. The diagram, for purposes of description, shows in dotted lines the linkage for the front left wheel 32 of the vehicle. The position of the point 101, representing the collar, corresponds to straight ahead position of the wheel. As previously described, the collar is connected through link 76 to the steering arm 73 which in turn moves about the pivotal axis of pin 67 in conjunction with the wheel spindle 71. It is to be noted that in this particular design the fixed angle between the axis of the steering spindle 71 and the steering arm 73 is 150°.

When the vehicle is to be turned sharply to the left and wheel 32 is to be pivoted about axis 67 a maximum amount to the left, the collar is translated to point 102 on axis 36 at which time link 76 occupies position 103 and the steering arm 73 has moved to position 104. Simultaneously, the spindle has moved to position 106 and has swept through an angle of 45° which for this design of vehicle is the proper angle of the wheel for this amount of turn.

If, however, the vehicle is to be turned to the right and wheel 32 is correspondingly to be pivoted to the right, the collar is moved along axis 36 into position 107 during which the link 76 assumes position 108, the steering arm 73 assumes position 109, and the spindle 71 assumes position 111 having swept through a total of 34° which is the proper amount of dirigible movement for wheel 32 when the vehicle being considered is turned sharply to the right. This exact mechanism and the various motions are exactly duplicated but with reverse symmetry in conjunction with wheel 33 on the opposite side of the frame 6, so that identical mechanism on either side of the car serves to effect the proper steering of wheels 32 and 33.

As is also shown in Fig. 7 by the solid or full lines, the wheel 29 is properly steered with exactitude by this same type of mechanism but with a slight change in the dimensions of some of the parts. For instance, with wheel 29 when the collar is in position 101 the link 76 occupies position 112 and is connected to a somewhat longer steering arm 73 so that the articulated connection therebetween occurs at point 113. The angle between the steering arm and the spindle 71, however, remains at 150°.

When the vehicle is to be turned to the left and wheel 29 is to be given a maximum dirigible movement to the left, the collar is moved from position 101 to position 102 which is the identical amount of movement given by the collar in connection with wheel 32. Under these conditions and with a somewhat longer steering arm 73, link 76 occupies position 114 and the steering arm 73 occupies position 116 with the steering spindle at 117 having swept through 38° exactly the proper amount of pivotal movement for this condition.

When however, the vehicle is to be turned to the right, wheel 29 is steered by this mechanism by virtue of the collar 81 moving to position 107 on axis 36. The link 76 then takes position 118 while the steering arm 73 takes position 119 and the spindle 71 takes position 121. The spindle thus sweeps through 27° from straight ahead position which is the proper degree of turning for directing the wheel 29 the maximum amount to the right. An exactly similar mechanism but mounted with reverse symmetry is provided for wheel 30 on the opposite side of frame 6.

In a similar fashion steering mechanisms are provided for wheels 27 and 28 so that all of the dirigible wheels of the vehicle are simultaneously moved the exactly correct amount for the steering maneuver being executed. It will be observed that in addition to moving each of the wheels the mathematically proper amount, the steering mechanism is absolutely unaffected by any rising or falling movement of any of the wheels during such steering movement.

In accordance with our invention, therefore, we have provided a multi-wheeled vehicle, herein shown as having eight wheels, which is properly steered for all different degrees of turning and which is unaffected by rising and falling movement of the wheels. Further, a suitable wheel support is provided so that the wheels can move individually to effect a proper distribution of the load without the introduction of deleterious gyroscopic forces and so that a proper resilient cushion is interposed between the ground and the frame of the vehicle.

It is to be understood that we do not limit ourselves to the form of the vehicle shown and described herein, as the invention, as set forth in the following claim may be embodied in a plurality of forms.

We claim:

A vehicle comprising a main frame, a hollow support arm mounted on said frame to rotate in a vertical plane and about a transverse axis, a dirigible wheel pivotally mounted on said arm, steering means movable along said axis, and a link within said support arm connected to said steering means for moving said wheel pivotally.

In testimony whereof, we have hereunto set our hands.

CHARLES A. HAWKINS.
HORACE L. HIRSCHLER.
MARCUS LOTHROP.